(12) United States Patent
Rao

(10) Patent No.: US 7,792,802 B1
(45) Date of Patent: Sep. 7, 2010

(54) ARCHIVING LOGS WITH SNAPSHOTS FOR DATA RECOVERY

(75) Inventor: Hariprasad Mankude Bhasker Rao, Union City, CA (US)

(73) Assignee: 3PAR, Inc., Fremont, CA (US)

( * ) Notice: Subject to any disclaimer, the term of this patent is extended or adjusted under 35 U.S.C. 154(b) by 234 days.

(21) Appl. No.: 11/681,738

(22) Filed: Mar. 2, 2007

(51) Int. Cl.
*G06F 17/00* (2006.01)
(52) U.S. Cl. .................. 707/657; 707/661; 707/791; 707/802; 711/100; 711/161; 711/162
(58) Field of Classification Search .............. 707/653, 707/654, 657, 661, 791, 802; 711/100, 161, 711/162
See application file for complete search history.

(56) References Cited

U.S. PATENT DOCUMENTS

| 6,678,809 | B1 * | 1/2004 | Delaney et al. | 711/162 |
| 7,328,226 | B1 * | 2/2008 | Karr et al. | 707/204 |
| 7,389,394 | B1 * | 6/2008 | Karr et al. | 711/162 |
| 7,406,488 | B2 * | 7/2008 | Stager et al. | 707/204 |

* cited by examiner

*Primary Examiner*—Fred I Ehichioya
(74) *Attorney, Agent, or Firm*—Patent Law Group LLP; David C. Hsia

(57) ABSTRACT

A method for archiving a log for a data storage system includes the steps of logging host inputs/outputs to the log, creating a snapshot of the log when it is full, resetting a next write offset to the start of the log after the snapshot is created while continuing the logging to the log, performing copy-on-write of the log to the snapshot, and archiving the snapshot to an archived log.

12 Claims, 2 Drawing Sheets

ARCHIVING LOGS WITH SNAPSHOTS FOR DATA RECOVERY

FIELD OF INVENTION

This invention relates to a method for logging inputs/outputs (I/Os) of a data storage system to aid recovery of data in the event of a hardware or software failure or to provide a historical view of the data.

DESCRIPTION OF RELATED ART

Many data storage systems store data in a write back cache and then write the data back to the backend storage in an asynchronous write back mode. Logging is a technique commonly used in the data storage systems to aid recovery of the data in the event of a hardware or software failure.

Logging involves saving information related to data updates in a log at a separate location. The writes to the log are in addition to the updates to the actual data. The data is written to the log sequentially. The main requirement for logging is that the information saved in the log is sufficient enough to reconstruct the lost data in the event of a failure.

Since the log information is saved in a log, the space in the log is a finite quantity. To continue logging after reaching the end of the log, two mechanisms are mainly used: wraparound logs and archiving log.

When a wraparound log is full, the next write pointer to the log is reset to the beginning of the log and the previously stored information is overwritten. The disadvantage of a wraparound log is that it limits the recovery window to the size of the log. This implies that the recovery can be started only from the time corresponding to the oldest information in the log. This is a serious limitation for most of the applications.

Alternatively, a log can be archived once it becomes full. Updates from applications are not allowed to happen while the log is being archived. After the archiving is done, the updates restart and the data is saved in the log starting from the next write offset of zero. The issue with this approach is that the updates from the applications are blocked while the archiving process is in progress. This results in poor application performance.

To get around this problem, a commonly used method for log archiving uses more than one log. When an active log becomes full, it is set to archive mode and a second log is made the active log. All new data from the applications are now logged to the second log which is now the active log. While the archiving is going on, the updates from the applications are not blocked. However, one disadvantage of this method is that the logging process needs to be aware that a switchover of the logs has occurred. To do that, the logging process has to check the integrity of the new log, make appropriate updates to the internal data structures to point to the new log, and then write the log information to the new log. The second disadvantage of this method is that space for these multiple logs has to be statically allocated. The third disadvantage of this method is that if the archiving process is slow and the second log becomes full, the application writes will have to be blocked until the archiving process completes its work and the first log becomes available again.

Thus, what is needed is an improved logging method.

SUMMARY

In one embodiment of the invention, a method for archiving a log for a data storage system includes the steps of logging host I/Os to the log, creating a snapshot of the log when it is full, resetting a next write offset to the start of the log after the snapshot is created while continuing the logging to the log, performing copy-on-write of the log to the snapshot, and archiving the snapshot to an archived log.

BRIEF DESCRIPTION OF THE DRAWINGS

Use of the same reference numbers in different figures indicates similar or identical elements.

DETAILED DESCRIPTION

Figure 1:
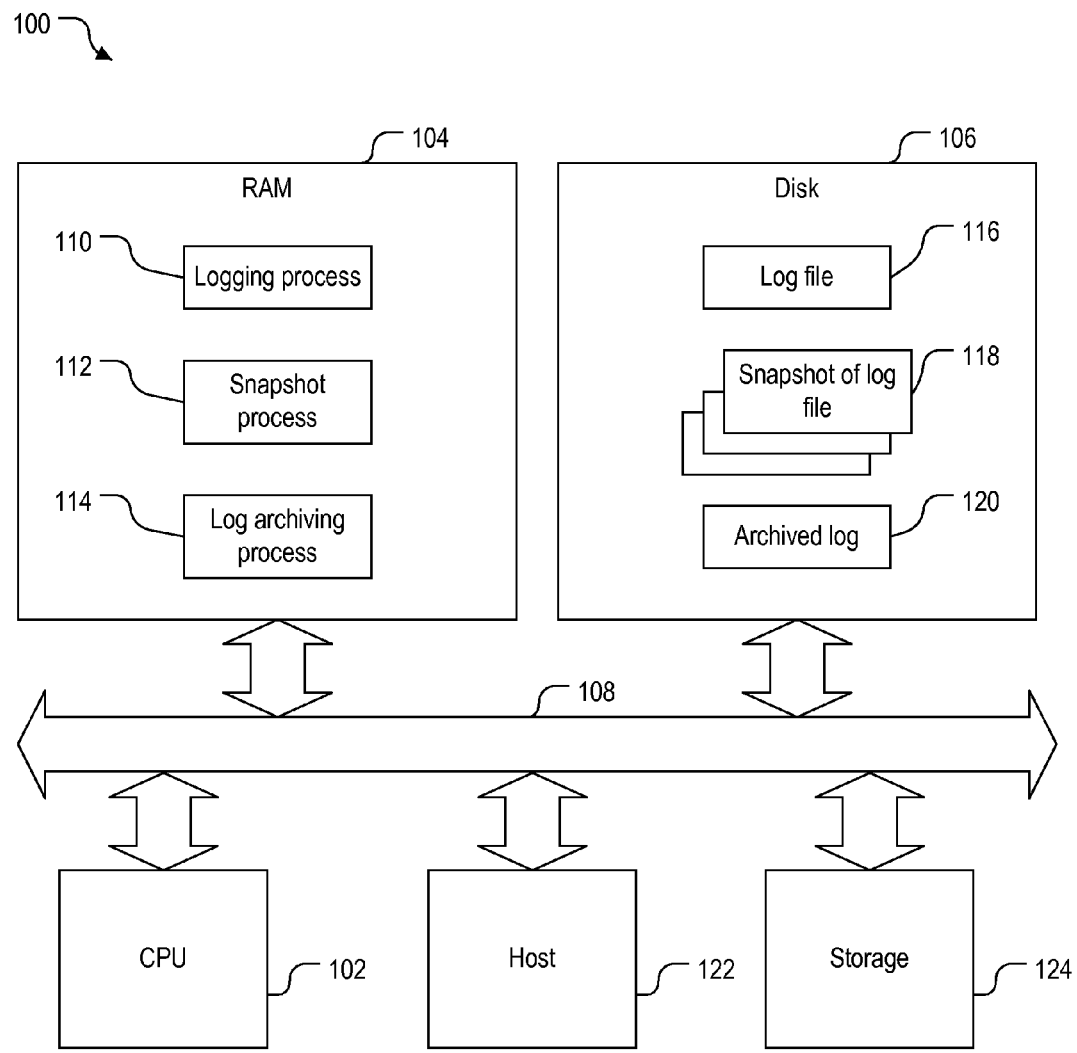
FIG. 1 is a block diagram of a computer system for logging host I/Os in a single log and archiving the log in one embodiment of the invention.

FIG. 1 is a block diagram of a computer system 100 in one embodiment of the invention. Computer system 100 may be a data storage system that stores data for host devices or a host server hosting applications such as a database system. Computer system 100 includes a processor 102 coupled to a volatile memory 104 (e.g., random access memory) and a nonvolatile memory 106 (e.g., a hard disk) by a bus 108. Processor 102 executes processes loaded into memory 104. These processes include a logging process 110, a snapshot process 112, and a log archiving process 114. Note that in other embodiments, nonvolatile memory 106 may be remote instead of local.

Logging process 110 creates a wraparound log 116 of host I/Os to computer system 100. Log 16 may be stored as a log file or a log volume. Host I/Os are reads and writes from one or more host devices 122 (e.g., a host server) to one or more storage devices 124 (e.g., a disk array) coupled to computer system 100. Snapshot process 112 creates one or more copy-on-write (COW) snapshots 118 of log 116 in nonvolatile memory 106. Log archiving process 114 archives the one or more COW snapshots 118 into an archived log 120 of log 116 in nonvolatile memory 106.

Figure 2:
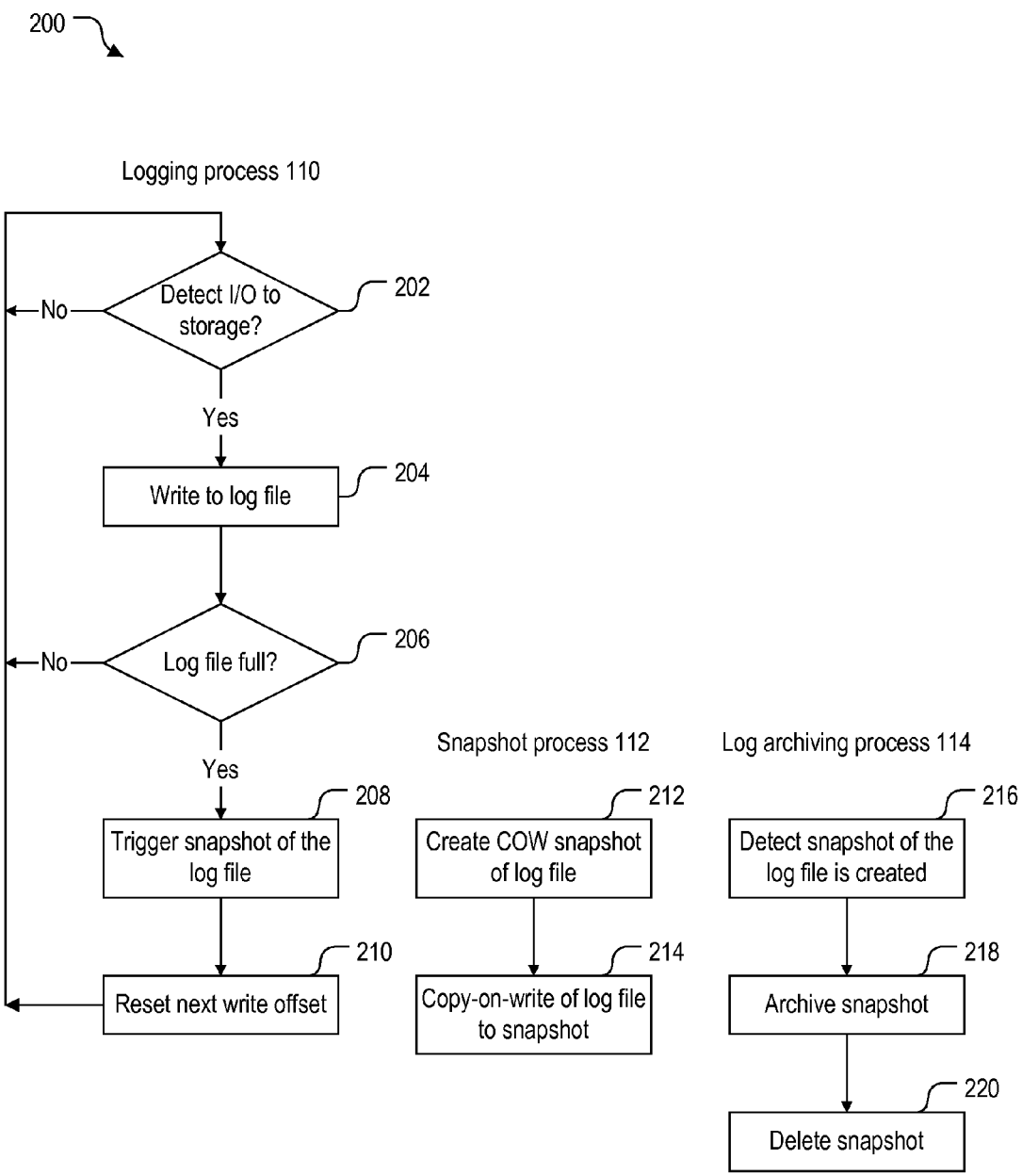
FIG. 2 is a flowchart of a method for the computer system of FIG. 1 to log host I/Os in a single log and archive the log in one embodiment of the invention.

FIG. 2 is a flowchart of a method 200 to archive log 116 using logging process 110, snapshot process 112, and log archiving process 114 executed by processor 102. Note that steps 202 to 210 are part of logging process 110, steps 212 and 214 are part of snapshot process 112, and steps 216 and 220 are part of log archiving process 114.

In step 202, logging process 110 determines if there are host I/Os to computer system 100. If so, then step 202 is followed by step 204. Otherwise step 202 loops until there are host I/Os to computer system 100.

In step 204, logging process 110 records the host I/Os to log 116 for data recovery purposes. Step 204 is followed by step 206.

In step 206, logging process 110 determines if log 116 is full. If so, then step 206 is followed by step 208. If log 116 is not full, then step 206 is followed by step 202 described above.

In step 208, logging process 110 triggers the taking of a COW snapshot 118 of log 116 at this instant in time. For example, logging process 110 instructs snapshot process 112 to take a COW snapshot 118 of log 116. Step 208 is followed by step 210.

In step 210, logging process 110 resets the next write offset of log 116 to the start of log 116 so that new host I/Os are wrapped around to the start of log 116. Host I/Os are never suspended as there is only one log 116. Step 210 is followed by step 202 described above.

In step 212, snapshot process 112 creates a COW snapshot 118 of log 116 in response to the action of logging process 110 in step 208. COW snapshot 118 preserves the image of log 116 at the instant in time which COW snapshot 118 is created. Step 212 is followed by step 214.

In step 214, snapshot process 112 copies the previous image of a block in the log 116 to COW snapshot 118 by a copy-on-write process when that block in log 116 is modified by a host I/O for the first time. Snapshot process 112 repeats step 214 for each block in the log 116 as the blocks in log 116 are modified by host I/Os.

In step 216, log archiving process 114 detects that a COW snapshot 118 of log 116 has been created by snapshot process 112 in step 212. Step 216 is followed by step 218.

In step 218, log archiving process 114 archives COW snapshot 118 into archived log 120. Snapshot process 112 provides the blocks stored in COW snapshot 118 to log archiving process 114. Note that archiving process 114 may request a block of COW snapshot 118 that has not been copied-on-write. In response, snapshot process 112 provides the requested block from the parent of COW snapshot 118, which is log 116. Step 218 is followed by step 220.

In step 220, log archiving process 114 optionally deletes COW snapshot 118 after it has been fully archived into archived log 120.

As described above, method 200 only has one log 116. After log 116 becomes full, logging process 110 causes a COW snapshot 118 to be taken of log 116 to create the first incarnation of the log and resets the next write offset of log 116 to zero. The reset of the next write offset causes log 116 to become the second incarnation of the log. The first incarnation of log is available as COW snapshot 118 while logging process 110 continues to log new host I/Os into the one and only log 116. Thus, no switchover of logs is necessary.

When new log information is added to log 116, the COW mechanism of snapshot process 112 saves the previous image of the data in that location in log 116 to COW snapshot 118. This happens transparently to logging process 110. Also, logging process 110 is aware of the presence of only one log 116 and does not have to worry about one active log among multiple logs. Log archiving process 114 reads COW snapshot 118 to get the original information. Snapshot process 112 transparently hands over the right data to log archiving process 114. Thus, both logging process 110 and log archiving process 114 can work in parallel on a single log 116.

After the second incarnation of the log is filled up, logging process 110 causes another COW snapshot 118 of log 116 to be taken and resets the next write offset of log 116 to zero. The reset of the next write offset makes log 116 the third incarnation of the log. The second incarnation of the log is now available as the new COW snapshot 118. At the same time, the old COW snapshot 118 that corresponds to the first incarnation of the log is full since all the data corresponding to the first incarnation have been copied over from the one and only log 116 to old COW snapshot 118 by now. If archiving process 114 has completed archiving the first incarnation of the log in the old COW snapshot 118, then the older COW snapshot 118 corresponding to the first incarnation of the log can be deleted.

Since a log is always read and written sequentially, there is no performance impact in using snapshots for archiving purposes. The number of incarnations of the log that can hang off the one and only log 116 as COW snapshots 118 is limited only by the available snapshot space. Furthermore, multiple COW snapshots 118 can exist when the archiving process is slow.

Various other adaptations and combinations of features of the embodiments disclosed are within the scope of the invention. Numerous embodiments are encompassed by the following claims.

What is claimed is:

1. A method for one or more processors in a data storage system to log and archive data, comprising:
    logging host inputs/outputs (I/Os) to a single log;
    when the log is full, creating a snapshot of the log;
    after said creating a snapshot of the log, resetting a next write offset to a start of the log while the host I/Os are being logged to the log;
    performing copy-on-write of the log to the snapshot of the log;
    archiving the snapshot of the log to an archived log while the host I/Os are being logged to the log;
    when the log is again full, creating another snapshot of the log;
    performing copy-on-write of the log to said another snapshot of the log; and
    archiving said another snapshot of the log to the archived log after said archiving the snapshot of the log.

2. The method of claim 1, further comprising:
    deleting the snapshot of the log after it has been archived.

3. The method of claim 1, wherein the log is selected from the group consisting of a log file and a log volume.

4. The method of claim 1, wherein the host I/Os are selected from the group consisting of reads and writes to the data storage system.

5. A data storage system, comprising:
    a memory storing:
        a single log;
        at least one snapshot of the log;
        an archived log of the log; and
    a processor executing instructions for archiving the log, wherein the instructions comprises:
        a plurality of instructions for a logging process, comprising:
            logging host inputs/outputs (I/Os) to the data storage system to the log;
            each time the log is full:
                triggering a creation of a snapshot of the log;
                after said triggering, resetting a next write offset to a start of the log while the host I/Os are begin logged to the log;
        a plurality of instructions for a snapshot process, comprising:
            in response to each said triggering a creation of a snapshot of the log:
                creating the snapshot of the log;
                performing copy-on-write of the log to the snapshot of the log;
        a plurality of instructions for an archiving process, comprising:
            in response to each said creating the snapshot of the log:
                archiving the snapshot of the log to the archived log after any prior snapshot of the log has been archived to the archived log.

6. The data storage system of claim 5, wherein the plurality of instructions for the archiving process further comprises:
    when the snapshot of the log has been archived, deleting the snapshot of the log.

7. The data storage system of claim 5, wherein the log is selected from the group consisting of a log file and a log volume.

8. The data storage system of claim 5, wherein the host I/Os are selected from the group consisting of reads and writes to the data storage system.

9. A non-transitory computer-readable storage medium encoded with one or more executable programs to log and archive data, wherein the one or more programs cause one or more processors to perform the following:

logging host inputs/outputs (I/Os) to a single log;

when the log is full, creating a snapshot of the log;

after said creating a snapshot of the log, resetting a next write offset to a start of the log while the host I/Os are being logged to the log;

performing copy-on-write of the log to the snapshot of the log;

archiving the snapshot of the log to an archived log while the host I/Os are being logged to the log;

when the log is again full, creating another snapshot of the log;

performing copy-on-write of the log to said another snapshot of the log; and archiving said another snapshot of the log to the archived log after said archiving the snapshot of the log.

10. The non-transitory computer-readable storage medium of claim 9, wherein the one or more programs further cause the one or more processors to perform the following:

deleting the snapshot of the log after it has been archived.

11. The non-transitory computer-readable storage medium of claim 9, wherein the log is selected from the group consisting of a log file and a log volume.

12. The non-transitory computer-readable storage medium of claim 9, wherein the host I/Os are selected from the group consisting of reads and writes to the data storage system.

\* \* \* \* \*